(12) United States Patent
Wolfe et al.

(10) Patent No.: US 8,689,886 B2
(45) Date of Patent: Apr. 8, 2014

(54) GATE VALVE SEAT AND SEAT RING

(75) Inventors: Christopher E. Wolfe, Niskayuna, NY (US); Dennis Gray, Delanson, NY (US); Leonardo Ajdelsztajn, Niskayuna, NY (US)

(73) Assignee: Vetco Gray Inc., Houston, TX (US)

( * ) Notice: Subject to any disclaimer, the term of this patent is extended or adjusted under 35 U.S.C. 154(b) by 259 days.

(21) Appl. No.: 13/164,556

(22) Filed: Jun. 20, 2011

(65) Prior Publication Data

US 2012/0318528 A1 Dec. 20, 2012

(51) Int. Cl.
E21B 34/02 (2006.01)

(52) U.S. Cl.
USPC .......................................... 166/373; 166/86.3

(58) Field of Classification Search
USPC ........ 166/373, 386, 80.1, 316, 86.3; 251/197, 251/328, 327, 172, 174
See application file for complete search history.

(56) References Cited

U.S. PATENT DOCUMENTS 6,454,015 B1 * 9/2002 Armstrong et al. ........... 166/387
7,255,328 B2 8/2007 Hunter

FOREIGN PATENT DOCUMENTS

| GB | 228269 A | 2/1925 |
| GB | 2352494 A | 1/2001 |
| GB | 2459570 A | 11/2009 |
| WO | 2008076855 A1 | 6/2008 |

OTHER PUBLICATIONS

GB Search Report dated Sep. 3, 2012 from corresponding Application No. GB1210692.8.

* cited by examiner

Primary Examiner — David Andrews
(74) Attorney, Agent, or Firm — Bracewell & Giuliani LLP

(57) ABSTRACT

A gate valve has a body, the body having a cavity and a flow passage intersecting the cavity. A seat is mounted to the body at the intersection of the flow passage and the cavity. A gate is installed at the cavity and has an engaging face that slidingly engages the seat while the gate is being moved between open and closed positions. The end faces between a seat pocket and the seat are hard-coated and smooth-finished to provide sealing when mated. The hardcoated pocket and seat sealing surfaces extend the life of the valve by eliminating the need for an elastomeric seal of limited life.

20 Claims, 4 Drawing Sheets

GATE VALVE SEAT AND SEAT RING

FIELD OF THE INVENTION

This invention relates in general to valves, and in particular to a seat seal in a valve body.

BACKGROUND OF THE INVENTION

Gate valves are typically used when a straight-line flow of fluid and minimum flow restriction are required. They may also be used in christmas trees used for oil and gas extraction. Typically, the gate has body with a cavity and a flow passage extending through the body and intersecting the cavity to allow flow through the valve. When the valve is wide open, the gate is drawn into an end of the valve cavity away from the flow passage. The flow passage is typically the same size as the pipe in which the valve is installed.

A typical gate valve used in connection with oil and gas production has a flow passage that intersects a central cavity in the valve. Seat rings are placed in counterbores formed in the flow passage at the intersection of the flow passage with the cavity. An obstruction or gate is moved past the seats between open and closed positions to seal the cavity from the passage.

The seats generally have seals which seal the seat to the counterbore of the flow passage. These seals are typically elastomeric seals and when located on the downstream seat prevent the entry of fluid from the central cavity or chamber of the body to the downstream flow passage. Seals located on the upstream seat can act as a check valve to fluid flow. For gate valves designed with unidirectional sealing when the gate is closed, fluid will flow past the upstream seat into the chamber or cavity of the body. The fluid pressure in the chamber is sealed by the seal of the downstream seat formed between the gate and the seat. In addition, a sand screen may also be positioned in the seats to protect the valve from sand intrusion. For gate valves designed with bidirectional sealing when the gate is closed, fluid is maintained on one side of the gate and not allowed to flow into the chamber or cavity of the body.

Typically, there is a small amount of movement possible for the seat, resulting in axial movement of the seal as the valve opens and closes. This axial movement results in seal wear. When gate valves are subjected to high pressure environments, creep and yield can result in elastomeric seal wear. This results in a life-limited seal. The elastomeric seal also has temperature limits that prevent use at the highest temperatures seen in oil and gas fields. To counter this problem, a Teflon-type elastomeric seal has been used. The seal is pressure actuated to seal when in the downstream seal position and loaded from the direction of the valve cavity, as shown in FIG. 1. When in the upstream seat position, the pressure load from the pipe direction tends to collapse the seal at a relatively low pressure once the seal is overcome. A T-shaped insert prevents that collapse from resulting in damage to the spring. However, this configuration does not address the wear associated with elastomeric seals.

A need exists for a technique to increase life of seals in gate valves by reducing wear in the seat seal.

SUMMARY OF THE INVENTION

The primary purpose of the invention is to increase the life of a gate valve by reducing wear on the seat seal. This is proposed to be achieved by hardcoating the seat and pocket sealing surfaces. The hardcoating may be composed of a ceramic carbide with a metal matrix (cermet or cemented carbide), such as tungsten carbide with a cobalt chromium matrix. The hardcoated seat and pocket surfaces are smooth-finished, with the finish being comparable to those on gate and matching seat surfaces. Sealing is thus provided by these hardcoated, smooth-finished seat and pocket surfaces when they mate. The hardcoating advantageously provides increased stiffness and hardness to the seat and pocket surfaces, relative to the elastomeric seals used in gates and seats in the prior art. The higher stiffness and hardness of the hardcoated material may increase the life of the valve by reducing wear at the seat-pocket interface.

In a first embodiment of the invention, a gate valve has a body with a cavity and a flow passage intersecting the cavity. Seats are mounted in the body at the intersection of the flow passage and the cavity. A gate in the cavity has an engaging face that slidingly engages the face of each seat while being moved between open and closed positions. Both the seats and the gate may be constructed from a metallic material. The interfacing surfaces between the seats and the gate may be hardcoated. The interfacing surfaces between the seat and pocket may also be hardcoated and smooth-finished to provide a seal at this interface.

Spring elements may be located within recesses formed on each seat between the seat and pocket. The spring elements are used to locate the seats against the gate from whichever direction the gate is loaded.

DETAILED DESCRIPTION OF THE INVENTION

Figure 1:
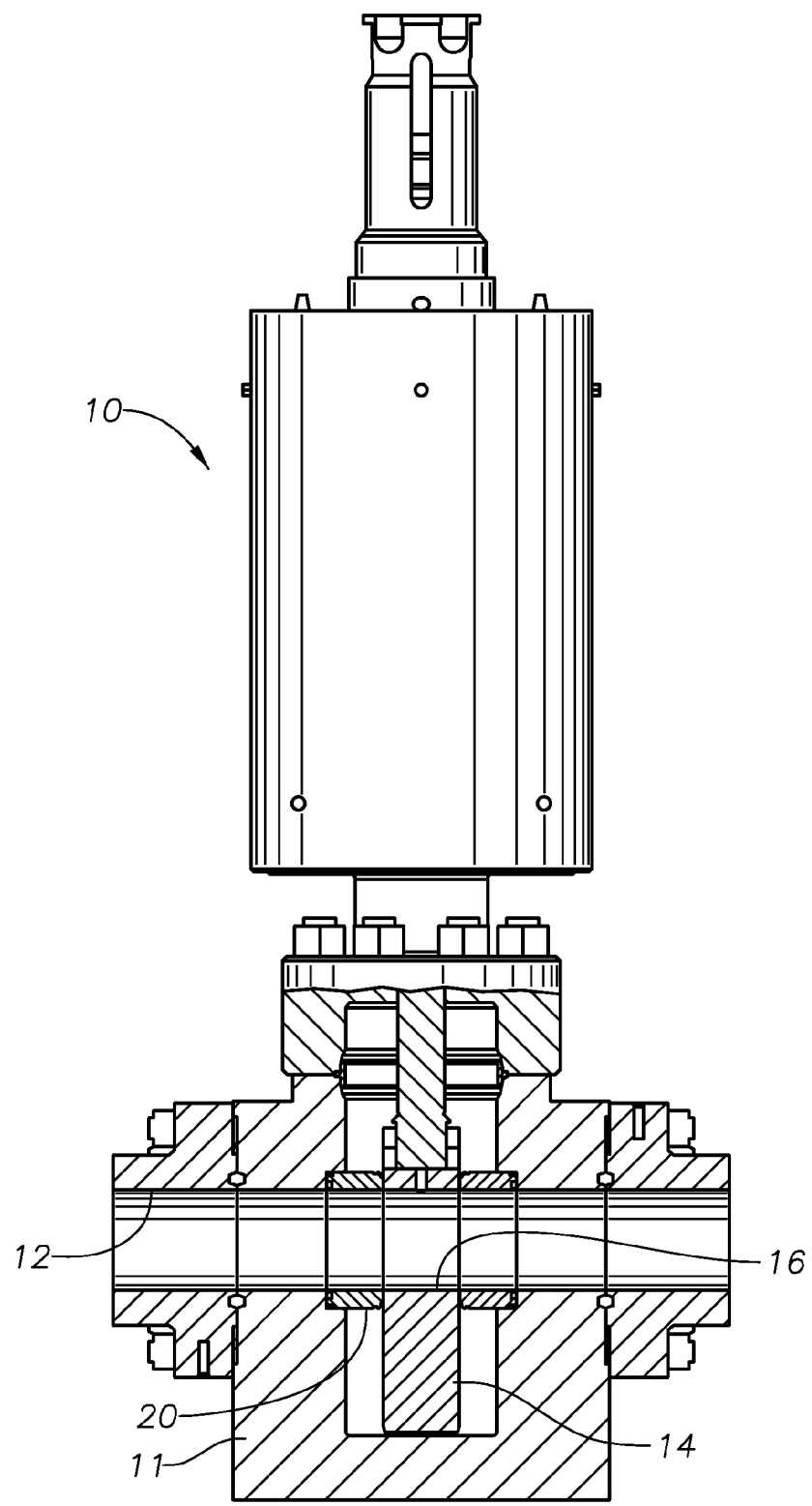
FIG. 1 is a vertical partial sectional view of a gate valve of the prior art.
Figure 2:
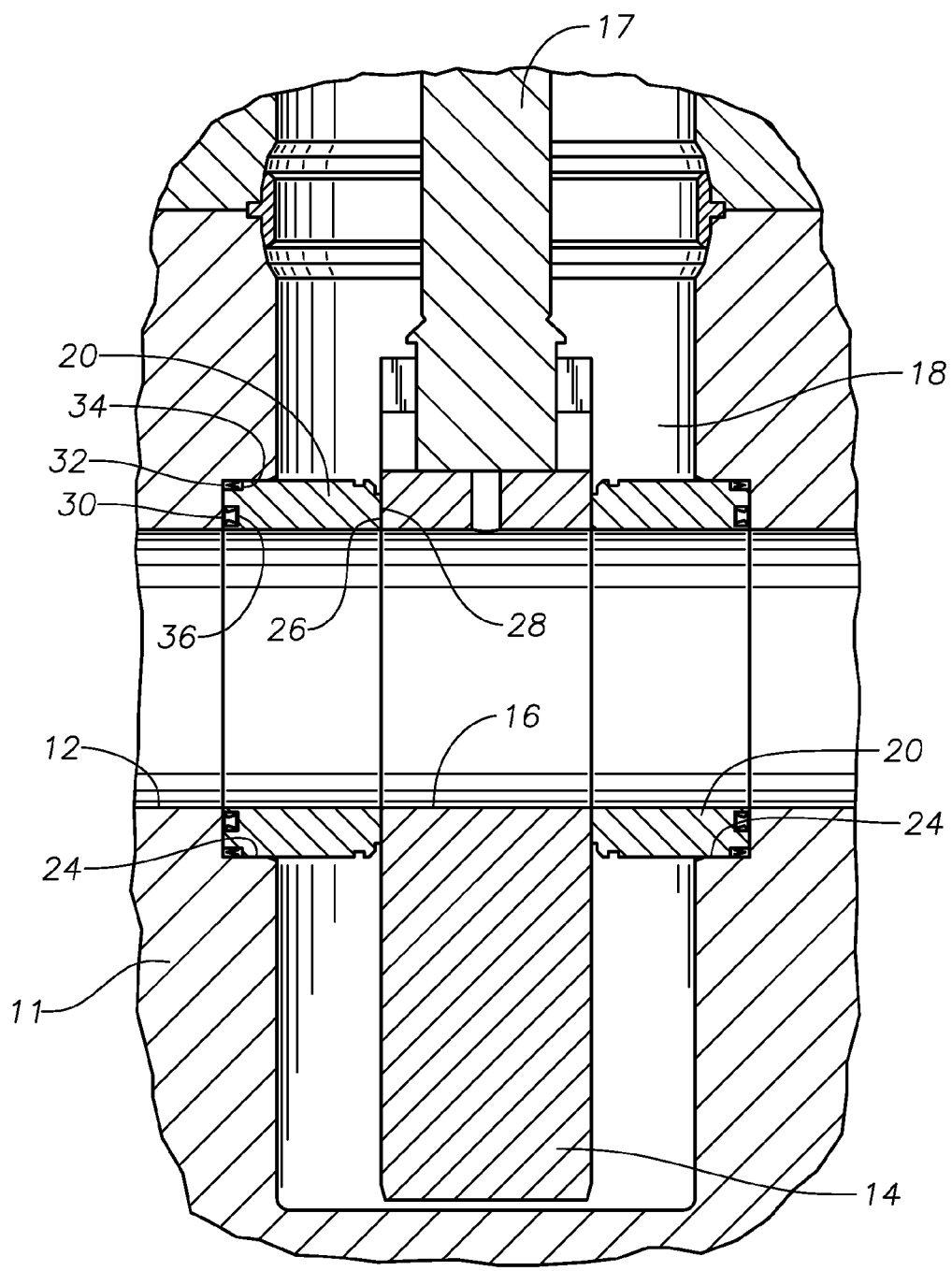
FIG. 2 is a sectional view of a portion of a valve body shown in FIG. 1.

Referring to FIGS. 1 and 2, a gate valve 10 as known in the prior art is shown. The gate valve 10 has a body 11 and a flow passage 12 that extends transversely through body 11. Valve 10 has a gate 14 with an opening 16 therethrough. Gate 14 is shown in the open position. The gate 14 travels within a cavity 18 in the body 11 that is transversal to and intersected by the passage 12. Also shown in FIG. 2 are ring-shaped valve seats 20 that seal against counterbores 24 formed on the body 11. The seats 20 have openings that register with the flow passage 12 of the valve, which intersects the cavity 18 formed in the valve body 11.

Continuing to refer to FIG. 2 of this prior art gate valve 10, when gate 14 is moved to the open position by the stem 17 connected to it, the opening 16 of the gate 14 registers with flow passage 12 of the valve 10, thereby allowing flow through the valve 10. When the gate 14 is closed, the opening 16 no longer registers with the flow passage 12 and thus flow is stopped. The gate 14 has an engaging face 26 on each side that interfaces with a seat face 28. While gate 14 is open, fluid is flowing through the flow path 12. At the interface formed by a seat 20 and the body 11, the counterbore or seat pocket 24 is formed. An elastomeric sealing element 32 is located at the interface to provide a seal and thus prevent the flow of fluid through the interface and into the cavity 18. This is the case when the sealing element 32 is on the downstream side of the valve 10 A spring element 30 is also located at the interface of the seat pocket 24 and seat 20. The spring element 30 pushes the seats 20 against the gate 14 from whichever side the gate 14 is loaded. When the gate 14 is closed, the downstream or low pressure side seat 20 will be urged against the gate 14 by the spring element 30 to prevent fluid from the cavity 18 from entering the flow passage 12 on the downstream side. The sealing element 32 and spring element 30 are located within recesses 34, 36 formed on the seats 20. Additionally, a sand screen (not shown) can be used to prevent debris from entering between the seat 20 and body 11.

Although the elastomeric seal element 32 may provide sealing, the small amount of movement possible for the seat results in axial movement of the seal as the valve opens and closes. This axial movement results in seal wear. When gate valves 10 are subjected to high pressure environments, creep and yield can result in the elastomeric seal wear. This results in a life-limited seal. The elastomeric seal 32 also has temperature limits that prevent use at the highest temperatures seen in oil and gas fields.

Figure 3:
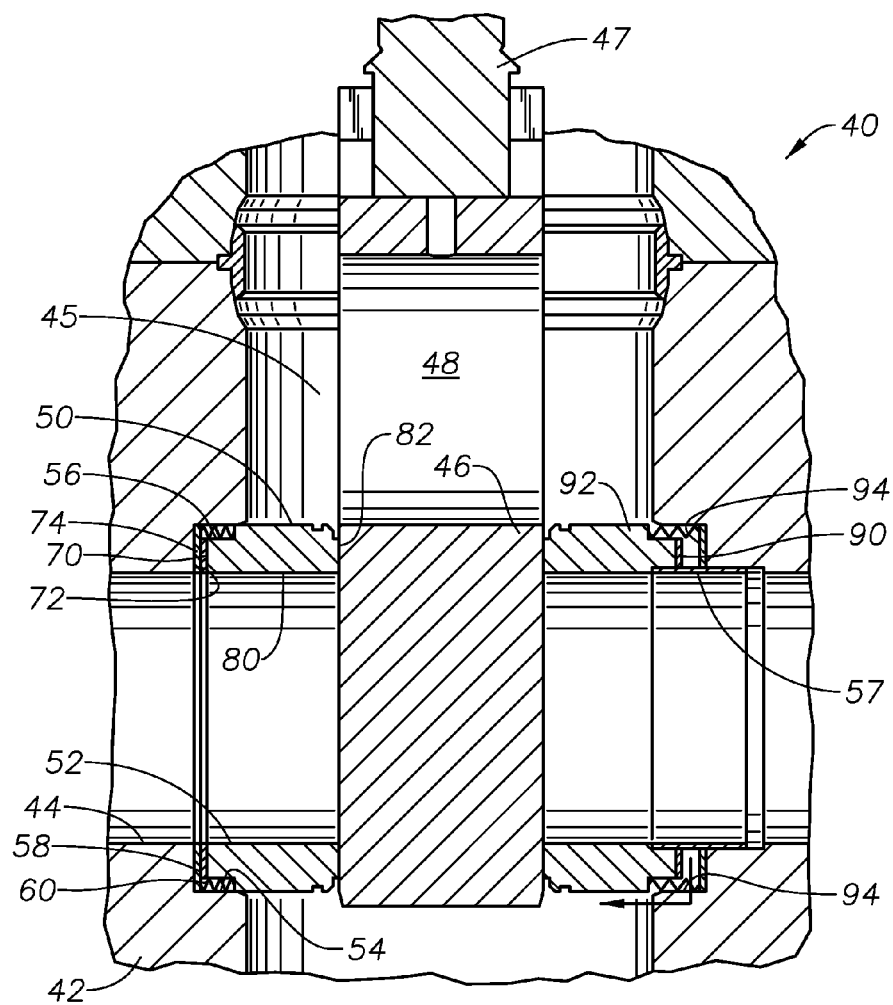
FIG. 3 is an enlarged sectional view of the coated seat and pocket surfaces, in accordance with an embodiment of the invention.

Referring to FIG. 3, an embodiment of the invention addressing the issues described above, is shown. As in the prior art, the gate valve 40 in this embodiment has a body 42 and a flow passage 44 that extends transversely through body 42, intersecting a cavity 45. Valve 40 has a gate 46 with an opening 48 therethrough. The gate 46 is moved between open and closed positions by a stem 47 connected to it. The gate 46 is shown in the closed position such that the gate 46 is loaded from a high pressure side (Phigh) and thus has a low pressure side (Plow) on the downstream side of the gate 46. This gate valve 40 is shown designed as a bi-directional valve that allows fluid to flow in either direction. Also shown are ring-shaped valve seats 50 having an opening 52 that seals against a counterbore 54 formed on the body 42. The openings 52 in the seats 50 register with the flow passage 44 of the valve 40 and the gate opening 48 when in the open position.

Continuing to refer to FIG. 3, an annular recess 56 is formed in an outer end face 58 of the seat 50. In this example, recess 56 is at an intersection of the outer diameter and end face 58 of seat 50. End face 58 is perpendicular to the axis of flow passage 44. A spring element 60 is carried within the recess 56 and has a spring energy property that urges the seat 50 against the gate 46. The recess 56 and spring element 60 are located at each seat 50 in this bi-directional valve design. Alternatively, a recess and spring element may only be located on a downstream side if a valve is designed for uni-directional flow. The spring element 60 may be a metallic spring.

Figure 3A:
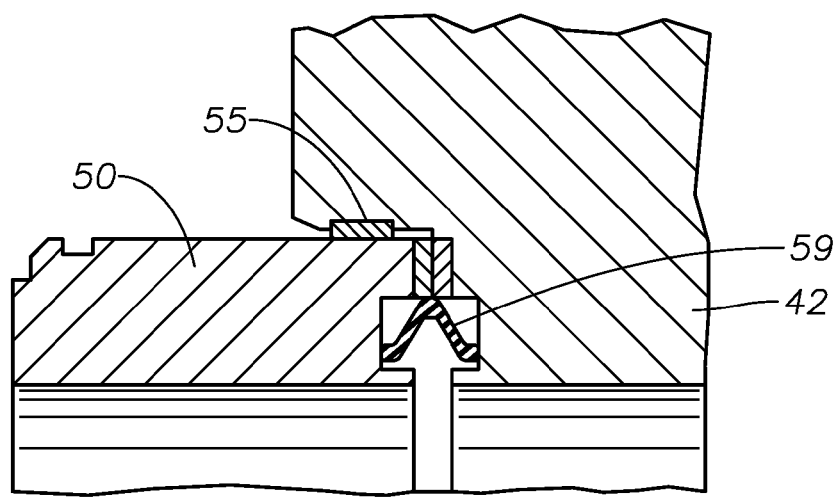
FIG. 3A is an enlarged sectional view of a debris barrier between seat and pocket surfaces of FIG. 3.

To protect the sealing surface between seat 50 and counterbore 54 from debris entering from the flow passage 44 and also from the gate cavity 45. An engress from seat conduit would be picked up by a silt barrier 57 and the engress from the cavity 45 could be picked up from a close toleranced wear bushing 55 as shown in FIG. 3A. The wear bushing 55, in this embodiment, can also function to centralize seat 50 during opening and closing which may prevent the face-to-face seal of being exposed to non-compressive stresses and prevent the engress of debris into the sealing area. The bushing 55 may be fabricated from PolyEtherEtherKetone (PEEK). Further, a sand excluder 59 could be located at seat-gate interface within a corresponding recess formed at the interface. The sand excluder 59 may be a sigma-type spring seal fabricated from PEEK.

Figure 4:
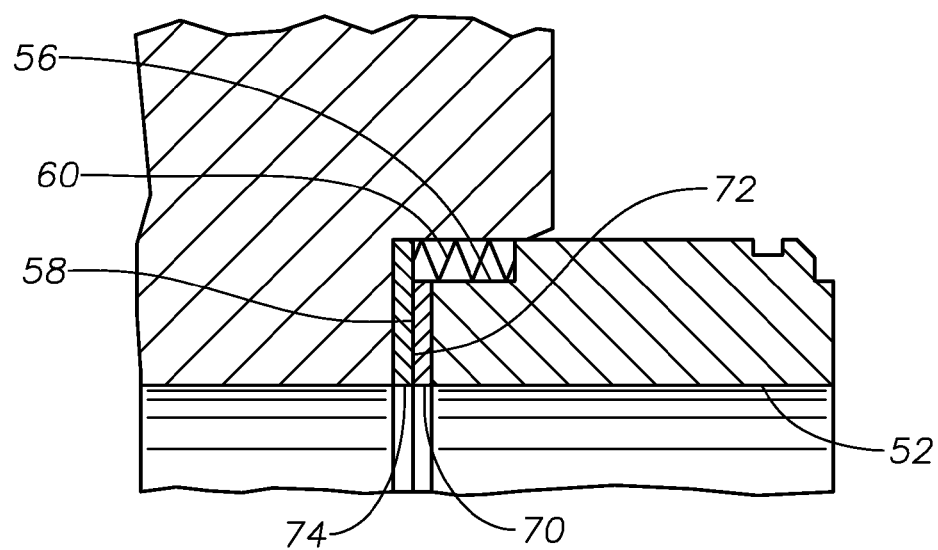
FIG. 4 is an enlarged sectional view of the hardcoated seat and pocket surfaces shown in FIG. 3, in accordance with an embodiment of the invention.

In this embodiment, the face 58 of the seat 50 has a hardcoating 70 that mates with an end face 72 on the counterbore 54 that also has a hardcoating 74. End face 72 is an annular flat surface perpendicular to the axis of the flow passage 44. An enlarged sectional view of the hardcoatings 70, 74 is shown in FIG. 4. The hardcoatings 70, 74 in this embodiment are hardcoated and smooth finished similar to an engaging surface 80 on the gate 46 and an engaging surface 82 on the seat 50. The hardcoatings 70, 74 may be composed of a ceramic carbide with a metal matrix (cermet or cemented carbide), such as tungsten carbide with a cobalt chromium matrix and may be applied by various known means, such as via bonding, welding, coating, brazing, or gluing to the surfaces. The hardcoated, smooth-finished seat and pocket end surfaces 58, 72 thus provide sealing when they mate. When the gate 46 is closed, as shown, the seat and pocket surfaces 58, 72 sealingly abut each other to prevent fluid flow from the cavity 45 from flowing into the low pressure (Plow) side of the valve 40. Seat end surface 90 of an upstream seat ring 92 and pocket end surface 94 on the high pressure (Phigh) side of the valve 40 may also be hardcoated and smooth finished as those surfaces 58, 72 on the low pressure side of the valve 40. When the gate 46 is closed, the seat and pocket surfaces 90, 94 on the high pressure side do not mate. A clearance between surface 58, 72 allows fluid to flow into and pressurize the cavity 45 via a leak path 96 between the surfaces 90, 92. Surfaces 90, 94 comprise the outer diameter of seat 50 and inner diameter of counterbore 54. In this embodiment, the hardcoating 70, 74 on each of the end faces 58, 72, 90, 94, has thickness ranging from about 0.001 inches thick to about 0.5 inches thick. An annular clearance exists between these inner and outer diameter surfaces. The hardcoatings 70, 74 advantageously provide increased stiffness and hardness to the seat and pocket end surfaces 58, 72 relative to the elastomeric seals used in gates and seats in the prior art. The higher stiffness and hardness of the hardcoated material may increase the life of the valve 40 by reducing wear at the seat-pocket interface. There is no need for an elastomeric seal such as seal 32 of FIG. 2.

The hardness of the tungsten cemented carbide coatings may be approximately Rockwell C 72-73. The Seat 54 and gate 46 material can be made from corrosion resistant steel alloys such as one of the following: Inconel (a nickel-chrome alloy); high quality low alloy steel; stainless steel; combinations thereof; or another suitable metal material. Inconel 718, for example, typically has a Rockwell Hardness Number (HRN) in the C scale between 32 and 40. Material properties can be altered by heat treatment processes. Thus, an example embodiment of the tungsten carbide coatings 70, 74 of the sealing surfaces 58, 72 can be approximately twice as hard as Inconel 718 material. Although tungsten cemented carbide is discussed as a hardcoating, other types of compounds may be utilized.

Other materials may also be utilized for hardcoating. For example, cermets or cemented carbides that have a high volume fraction (>40 volume percent) of ceramic particles, such as chromium carbide (CrC) or titanium carbide (TiC) in a metal matrix such as that made of cobalt chromium (CoCr) Nickel Chromium (Ni Cr) or iron chromium (FeCr). In one example, the ceramic particles are less then 2 microns in size.

In operation, when gate 46 is open, neither the upstream end faces 90, 94 or the downstream end faces 58, 72 are abutting each other. Fluid in passage 44 can flow around gates in cavity 45 but cavity is sealed by a stem seal. When gate 46 closes, high pressure from upstream flow passage pushes upstream seat ring 92 against gate 46 and the end face 90 go to open position of FIG. 3. Gate 46 pushes downstream seat ring 50 exactly until its end face 58 contacts and seals against counterbore end face 72.

This written description uses examples to disclose the invention, including the best mode, and also to enable any person skilled in the art to practice the invention, including making and using any devices or systems and performing any incorporated methods. These embodiments are not intended to limit the scope of the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A gate valve comprising:
   a body with a chamber;
   a flow passage having an axis and extending through and having a counterbore intersecting the chamber;
   a counterbore in the flow passage at the intersection with the chamber defining an inward facing end face;
   an annular seat ring carried in the counterbore, the seat ring having an outward facing endface and being axially movable in the counterbore between an open position with the end faces axially separated and a closed position with the end faces abutting each other;
   a gate in the cavity and having an engaging face that slidingly engages a seal face on the seat while being moved between open and closed positions; and
   a hardcoating on the end faces for sealing against each other while the seat ring is in the closed position.

2. The apparatus according to claim 1, further comprising a spring element between the seat ring and the end face of the counterbore, the spring element urging the seat ring toward the open position.

3. The apparatus according to claim 1, wherein the hardcoating is a cemented carbide.

4. The apparatus according to claim 1, wherein the seat ring moves axially to the closed position in response to fluid pressure on a high pressure side of the flow passage.

5. The apparatus according to claim 1, wherein the hard coating has hardness greater than the seat and the body of the valve.

6. The apparatus according to claim 1, wherein the hardcoating comprises:
   a substrate of cemented carbide bonded to the end faces.

7. The apparatus according to claim 1, wherein the hardcoating comprises:
   a layer comprising a cemented carbide hardfacing welded, coated, brazed, or glued onto the end of end faces.

8. The apparatus according to claim 1, wherein the end faces are perpendicular to the axis.

9. The apparatus according to claim 1, wherein the hardcoating on each of the end faces has thickness ranging from about 0.001 inches thick to about 0.5 inches thick.

10. The apparatus according to claim 1, further comprising:
    an annular recess at an intersection of an outer diameter of the seat ring and the end face of the seat ring; and
    a spring in the recess and in engagement with the end face of the counterbore, the spring urging the seat ring toward the open position.

11. The apparatus according to claim 1, further comprising an annular clearance between an outer diameter of the seat ring and the counterbore, the clearance communicating fluid in the cavity to the end faces.

12. The apparatus according to claim 1, wherein the seat ring is free of any elastomeric sealing elements.

13. A gate valve comprising:
    a body with a cavity;
    a passage through the body and intersecting the cavity, defining upstream and downstream passage positions for handling a flow of a fluid;
    an upstream counterbore in the flow passage at the intersection with the chamber defining an inward facing end face;
    a downstream counterbore in the flow passage at the intersection with the chamber defining an inward facing end face;
    an annular upstream seat ring carried in the upstream counterbore, the seat ring having an outward facing endface and being axially movable in the upstream counterbore between an open position with the end faces axially separated and a closed position with the end faces abutting each other;
    an annular downstream seat ring carried in the downstream counterbore, the seat ring having an outward facing endface and being axially movable in the downstream counterbore between an open position with the end faces axially separated and a closed position with the end faces abutting each other;
    a gate in the cavity selectively movable and having an engaging face that slidingly engages a seal face on each of the seat rings while being moved between open and closed positions; and
    a hardcoating on the end faces of the upstream and downstream seat rings and of the end faces of the counterbores for sealing against each other while either of the seat rings is in the closed position;
    a hardcoating layer on a sealing surface of the seat ring, the sealing surface of the seat ring being in sealing and sliding engagement with the gate;
    wherein while the downstream seat ring is in the closed position, the upstream sealing ring is in the open position.

14. The apparatus according to claim 13, further comprising a spring element between either of the upstream or downstream seat rings and the corresponding end face of the upstream or downstream counterbore, the spring element urging the seat ring toward the open position.

15. The apparatus according to claim 13, wherein either of the seat rings move axially to the closed position in response to fluid pressure on a high pressure side of the flow passage.

16. The apparatus according to claim 13, wherein the hardcoating comprises:
    a layer comprising a cemented carbide hardfacing welded onto the end of end faces.

17. The apparatus according to claim 13, wherein the hardcoating on each of the end faces has thickness ranging from about 0.001 inches thick to about 0.5 inches thick.

18. A method of controlling a flow of a wellbore fluid with a gate valve, comprising:
    providing a body with a chamber, a flow passage having an axis and extending through and having a counterbore intersecting the chamber, a counterbore in the flow passage at the intersection with the chamber defining an inward facing end face, an annular downstream seat ring carried in the counterbore, the seat ring having an outward facing endface and being axially movable in the counterbore between an open position with the end faces axially separated and a closed position with the end faces abutting each other, a gate in the cavity and having an engaging face that slidingly engages a seal face on the seat while being moved between open and closed positions, and a hardcoating on the end faces for sealing against each other while the seat ring is in the closed position;

flowing wellbore fluid through the flow passage by positioning the gate into an open position;

blocking flow through the flow passage by positioning the gate into a closed position allowing fluid to leak into the chamber from a high pressure side of the valve to thereby pressurize the chamber, wherein the downstream seat ring moves axially in the counterbore from an open position to a closed position in response to fluid pressure on upstream side of the flow passage; and sealing a low pressure side of the valve to prevent fluid flow from the chamber into the flow passage on the low pressure side via sealing engagement of the hardcoated end faces of the counterbore and downstream seat ring of the valve when the gate is closed, wherein the hardcoated end faces axially abut each other.

19. The method of claim 18, wherein while gate valve is in open position, a spring urges end faces apart from each other.

20. The method of claim 18, wherein an upstream seat ring is in an open position while the gate is closed and downstream seat ring is in closed position.

* * * * *